United States Patent [19]

Mann

[11] Patent Number: 5,167,504
[45] Date of Patent: Dec. 1, 1992

[54] BILINGUAL DICTIONARY

[76] Inventor: Harold J. Mann, 6180 Sea Isle, Galveston, Tex. 77554

[21] Appl. No.: 763,416

[22] Filed: Sep. 20, 1991

[51] Int. Cl.⁵ .............................................. G09B 19/06
[52] U.S. Cl. ..................................... 434/157; 434/170
[58] Field of Search ........................ 434/156, 157, 170

[56] References Cited

U.S. PATENT DOCUMENTS

| | | |
|---|---|---|
| 683,267 | 9/1901 | Froehlich . |
| 778,110 | 12/1904 | Cannon . |
| 2,840,926 | 7/1958 | Campbell ........................ 434/157 X |
| 3,271,884 | 9/1966 | Roberson . |
| 3,369,308 | 2/1968 | Curran ........................... 434/170 X |
| 4,270,284 | 6/1981 | Skellings . |
| 4,643,450 | 2/1987 | Morris . |

Primary Examiner—Richard J. Apley
Assistant Examiner—Karen Richard
Attorney, Agent, or Firm—William S. Ramsey

[57] ABSTRACT

This invention is an improved bilingual dictionary in which cognates are physically distinguished from other words. Cognates are words which are identical in meaning and similar in spelling in two languages. Such words are distinguished from other words in the dictionary by being printed against a distinctly colored background, by being printed with distinctly colored ink, by being printed in a distinguishing typeface, by location in a column of words, or by adjacent symbols. The object of this bilingual dictionary is to facilitate a student's recognition and appreciation of the number of words in a second language which the student already knows without additional study.

18 Claims, 1 Drawing Sheet

| YB | LIMITATION, LIMITAC ION |
|---|---|
| GB | LIST, LIST A |
| RB | LITERAL, LITERAL |
| WB | CRAZY, LOCO |

| | |
|---|---|
| YB | LIMITATION, LIMITACION |
| GB | LIST, LISTA |
| RB | LITERAL, LITERAL |
| WB | CRAZY, LOCO |

Fig. 1

| | |
|---|---|
| YB | LIMITATION, LIMITA[C]ION |
| GB | LIST, LIST[A] |
| RB | LITERAL, LITERAL |
| WB | CRAZY, LOCO |

Fig. 2

| | |
|---|---|
| YI | LIMITATION, LIMITACION |
| GI | LIST, LISTA |
| RI | LITERAL, LITERAL |
| BI | CRAZY, LOCO |

Fig. 3

LIMITATION, LIMITACION

LIST, LISTA

LITERAL, LITERAL

CRAZY, LOCO

Fig. 4

| | |
|---|---|
| S | LIMITATION, LIMITACION |
| I | LIST, LISTA |
| B | LITERAL, LITERAL |
| R | CRAZY, LOCO |

Fig. 5

O LIMITATION, LIMITACION

• LIST, LISTA

✧ LITERAL, LITERAL

CRAZY, LOCO

Fig. 6

BILINGUAL DICTIONARY

BACKGROUND OF THE APPLICATION

1. Field of the Invention

This invention relates to improvements in bilingual dictionaries which facilitate self-instruction in a foreign language in which words in a first language are listed in a column in alphabetical order. Words in the second language are placed adjacent to the words in the first language which correspond in meaning.

2. Description of Related Art

Students who know one language and wish to learn another are often gratified to discover that they in fact already know a number of words in the second language. These are words identical in meaning and identical or very similar in spelling in both languages. In particular, persons who know English will find many such words while studying Germanic, Celtic, or Italic languages. Unfortunately, the student often does not realize the existence of these words or recognize that the student has a vocabulary already at hand in the "other" language. These words are "known but not felt". This invention aids the student in recognition of these words and thereby expands the student's effective vocabulary in the new language.

U.S. Pat. No. 683,267 discloses educational media, such as a book, card, chart, or the like, having the syllables of a word appearing in contrasting colors.

U.S. Pat. No. 778,110 discloses cards used in teaching languages in which the tinting of the card is used to indicate the gender of nouns.

U.S. Pat. No. 3,271,884 discloses a self-instruction aid in which bound sheets having lists of words in the basic and foreign languages are aligned to facilitate association.

U.S. Pat. No. 4,270,284 discloses cathode ray tube generated graphic material displays using at least one color pair for better display of linguistic, literary, semantic, related, or stylistic features of such material.

U.S. Pat. No. 4,643,450 discloses a reading system and method of printing for faster reading in which printed sheets are provided with a vertical extending scan bar. Short lines of indicia are printed perpendicular to the scan bar with scan words therein printed in a bolder or different colored type font.

These prior art inventions do not accomplish the objectives of the present invention, that of aiding the language student by emphasizing the number of words in the foreign language which he or she already knows.

SUMMARY OF THE INVENTION

This invention is an improvement in bilingual dictionaries which enables the language student to realize the number of words identical or essentially identical in meaning in each language and identical or similar in spelling in each language, disregarding emphasis marks. Such words are called cognates and are related by descent from the same ancestral language. A surprising number of cognates exist in related languages. English is especially rich in cognates with Germanic, Celtic, and Italic languages. The foreign language student therefore often "knows" many words in the foreign language but does not recognize or feel he or she knows them.

This invention provides for a bilingual dictionary in which distinctive methods of printing are used to distinguish cognates from the other words and from other indicia in the dictionary. Distinctive printing is used to differentiate between the various categories of cognates. The number of varieties of cognates will depend on the specific languages included in the dictionary.

The object of this improvement in bilingual dictionaries is to stress word spelling similarities in words having similar meanings in two or more languages.

A further object is to provide graphic emphasis of word spelling similarities in words found in various languages.

A further object is to inform the foreign language student of the number of words in the foreign language already known to the student.

A further object is to emphasize the number of words in a second language which are already known by a student conversant in a first language.

A further object is to make a person conversant in English aware of the recognition vocabulary of words in other languages.

A further object is to build confidence in language students.

A further object is to provide increased motivation in language students.

A final object is to provide an improved bilingual dictionary in which similarities of spelling in the languages are emphasized in an emphatic, efficient and effective manner.

BRIEF DESCRIPTION OF THE DRAWINGS

FIG. 1 shows words with spelling similarities distinguished by color background printing.

FIG. 2 shows words with spelling similarities distinguished by color background while spelling differences are also distinguished.

FIG. 3 shows words with spelling similarities distinguished by color of printing.

FIG. 4 shows words with spelling similarities distinguished by location in a column.

FIG. 5 shows words with spelling similarities distinguished by typeface.

FIG. 6 shows words with spelling similarities distinguished by symbols.

DESCRIPTION OF THE PREFERRED EMBODIMENTS

Of the following preferred embodiments, the first embodiment is the most preferred embodiment.

In FIGS. 1-3, and 5, the method of distinguishing words is indicated in the column at the left side of the Figs. Symbols in the left side column indicate the method used in the line to the right of the symbol. In FIGS. 1-2, the words or portions of the words enclosed by a box are rendered according to the symbols in the left side column. In FIGS. 1-2, YB means yellow background; GB means green background; RB means red background; and WB means white background. In FIG. 3 the words are printed or displayed in the color indicated by symbols in the left side column. In FIG. 3, YI means yellow ink; GI means green ink; RI means red ink; and BI means black ink. In FIG. 5, the words are rendered in different typefaces according to the symbols in the left side column. In FIG. 5, S means script; I means italic; B means bold; and R means roman.

FIG. 1 shows a portion of a printed bilingual English-Spanish dictionary in which an English word is followed by the Spanish word with the same or essentially the same meaning. In the first embodiment of this invention shown in FIG. 1 cognates are distinguished from other indicia by color of the background surrounding each word. The words "literal" and "literal" are identical in meaning and spelling in each language, a first class of cognates distinguished by printing in black or dark ink on or against a red background. Emphasis marks are disregarded. The words "lista" and "list" are identical in meaning and differ in spelling only by the presence of one letter in one language which does not appear in the word in the other language, the terminal "a" in "lista". This is a second class of cognates distinguished by printing in black ink on a green background. The words "limitacion" and "limitation" are identical in meaning and differ in spelling only by the terminal "c" in the Spanish word which is replaced by the terminal "t" in the English word. This is a third class of cognates distinguished by printing in black ink on a yellow background. The words "loco" and "crazy" are identical in meaning but are not cognates and are not spelled similarly in Spanish and English Words of this fourth class which are not cognates comprise most of the words in a bilingual dictionary and are printed in black ink on a white background, or on the color of the bulk of the page.

FIG. 2 shows a second embodiment of this invention which is the same as the first embodiment except for the treatment of second and third class cognates In this second embodiment, the English word of second class cognate "list" is printed in black ink on a green background. Most of the corresponding Spanish word "lista" is printed in black ink on a white background. The letter in the spanish word which does not appear in the English word, the "a" in the case of "lista", is printed in black ink on a green background. Similarly, in the case of third class cognates, the English word "limitation" is printed in black on a yellow background. Most of the corresponding Spanish word "limitacion" is printed in black ink on a white background. The letter in the Spanish word which differs from the English word, the "c" in the case of "limitacion", is printed in black ink on a yellow background.

FIG. 3 shows a third embodiment of this invention in which the same classes in the first embodiment are distinguished from other indicia by the color of the ink used to print each word. In this embodiment, the background of the classes of words is the color of the paper, normally white. Words of the first class of cognates are printed in red ink. Words of the second class of cognates are printed in green ink. Words of the third class of cognates are printed in yellow ink. Words of the fourth class which are not cognates are printed in black or dark ink.

FIG. 4 shows a fourth embodiment of this invention in which words are all printed in black or dark ink on a white or light background but the classes of words are distinguished from other indicia by the location on the page. In this embodiment, the words are listed in columns. Words of the first class of cognates are printed at about the center of the column. Words of the second class of cognates are printed about half way between the left margin and the center of the column. Words of the third class of cognates are printed slightly displaced to the right of the left margin. Words of the fourth class which are not cognates are printed at the left margin of the column.

FIG. 5 shows a fifth embodiment of this invention in which words are printed in black or dark ink on a white or light background but the classes of words are distinguished from other indicia by the typeface or font used to print the words. Words of the first class of cognates are printed in bold type. Words of the second class of cognates are printed in italic. Words of the third class of cognates are printed in script. Words of the fourth class which are not cognates are printed in roman.

FIG. 6 shows a sixth embodiment of this invention in which words are printed in black or dark ink on a white or light background but the classes of words are distinguished from other indicia by symbols which proceed the words in the column. Words of the first class of cognates are proceeded by an arrow. Words of the second class of cognates are proceeded by a dot. Words of the third class of cognates are proceeded by a circle. Words of the fourth class which are not cognates are not proceeded by a symbol.

Although the examples showed bilingual dictionaries printed on paper, the term "bilingual dictionary" as used in this application, includes bilingual dictionaries in which other methods are used to display the words. The term "printed" includes printing on paper, cards, fabrics, transparancies, photographic reproductions and other types of printing. The term "display" includes liquid crystal displays and cathode tube displays, and other electronic displays.

An important aspect of this invention is the fact that the number and composition of classes of cognates will differ depending on the languages used. For example, the number and types of classes of cognates in Spanish and English will be different from the number and types of classes of cognates in German and English.

It will be apparent to those skilled in the art that the examples and embodiments described herein are by way of illustration and not of limitation, and that other examples may be utilized without departing from the spirit and scope of the present invention, as set forth in the appended claims.

I claim:

1. An improvement in a bilingual dictionary of the type used in facilitating self-instruction in a foreign language in which words in a first language are listed in alphabetical order and words in a second language having meaning corresponding to those in the first language are listed adjacent to those in the first language, said improvement comprising having words identical in both languages which are cognates and which are identical in spelling or differ only in one or a few letters in both languages printed or displayed in a manner other than the spelling of such words which distinguishes such words from words in the bilingual dictionary that are not cognates.

2. The improvement of claim 1 wherein the words in a first and second language in a bilingual dictionary are printed or displayed in either a first, second, third, or fourth manner, and wherein words equivalent in meaning in each language and having spelling identical in each language are printed or displayed in the first manner, said first manner being a manner other than the spelling of such words and other than the second, third, and fourth manners which distinguishes such words from words in the bilingual dictionary that are not cognates, words equivalent in meaning in each language which are cognates and have spelling differing only in the presence in one language of a letter absent in the other language are printed or displayed in the second manner, said second manner being a manner other than the spelling of such words and other than the first, third, and fourth manners which distinguishes such words from words in the bilingual dictionary that are not cognates, words equivalent in meaning in each language which are cognates and have spelling differing only in a single letter which appears in the corresponding position in the words in each language are printed or displayed in the third manner, said third manner being a manner other than the spelling of such words and other than the first, second and fourth manners which distinguishes such words from words in the bilingual dictionary that are not cognates, and words in the bilingual dictionary that are not cognates are printed or displayed in the fourth manner, said fourth manner being a manner other than the spelling of such words and other than the first, second and third manners.

3. The improvement of claim 2, wherein the first manner is a first color background surrounding the words, the second manner is a second color background surrounding the words, the third manner is a third color background surrounding the words, and the fourth manner is a fourth color background surrounding the words.

4. The improvement of claim 3, wherein the first color background is red, the second color background is green, the third color background is yellow, and the fourth color background is white.

5. The improvement of claim 2, wherein the first manner is a first color background surrounding the words, the second manner is a second color background surrounding all or part of the words, the third manner is a third color background surrounding all or part of the words, and the fourth manner is a fourth color background surrounding the words.

6. The improvement of claim 5, wherein the first color background is red, the second color background is green, the third color background is yellow, and the fourth color background is white.

7. The improvement of claim 2 wherein the first manner is printing or displaying the words in a first color, the second manner is printing or displaying the words in a second color, the third manner is printing or displaying the words in a third color, and the fourth manner is printing or displaying the words in a fourth color.

8. The improvement of claim 7 wherein the first color is red, the second color is green, the third color is yellow, and the fourth color is black.

9. The improvement of claim 2, wherein the first manner is a first typeface, the second manner is a second typeface, the third manner is a third typeface, and the fourth manner is a fourth typeface.

10. The improvement of claim 9, wherein the first type face is bold, the second type face is italic, the third typeface is script, and the fourth typeface is roman.

11. The improvement of claim 2, wherein the words of said first language are printed or displayed in a column and the first manner is being printed or displayed at a first displacement from the left margin of the column, the second manner is being printed or displayed at a second displacement from said margin of the column, the third manner being printed or displayed at a third displacement from said margin of the column, and the fourth manner being printed or displayed at said margin of the column.

12. The improvement of claim 11, wherein the first manner is being printed or displayed about the center of the column, the second manner is being printed or displayed about half way between the left margin and the center of the column, the third manner being printed or displayed slightly displaced to the right of the left margin of the column, and the fourth manner being printed or displayed at the left margin of the column.

13. The improvement of claim 2, wherein the first manner is a first symbol adjacent to the word in the first language, the second manner is a second symbol adjacent to the word in the first language, and the third manner is a third symbol adjacent to the word in the first language.

14. The improvement of claim 13 wherein the first symbol is an arrow, the second symbol is a dot, and the third symbol is a circle.

15. The improvement of claim 2, wherein the first manner is a first color other than white background surrounding the words, the second manner is a second color other than white background surrounding the words, the third manner is a third color other than white background surrounding the words, and the fourth manner is a fourth color background surrounding the words.

16. The improvement of claim 2, wherein the first manner is a first color other than white background surrounding the words, the second manner is a second color other than white background surrounding all or part of the words, the third manner is a third color other than white background surrounding all or part of the words, and the fourth manner is a fourth color background surrounding the words.

17. The improvement of claim 2 wherein the first manner is printing or displaying the words in a first color other than black, the second manner is printing or displaying the words in a second color other than black, the third manner is printing or displaying the words in a third color other than black, and the fourth manner is printing or displaying the words in a fourth color.

18. The improvement of claim 2, wherein the first manner is a first symbol adjacent to the word in the first language, the second manner is a second symbol adjacent to the word in the first language, and the third manner is a third symbol adjacent to the word in the first language, and the fourth manner is the absence of a symbol adjacent to the word in the first language.

* * * * *